United States Patent [19]

Suay Puig et al.

[11] Patent Number: 4,634,026
[45] Date of Patent: Jan. 6, 1987

[54] BREAD DOUGH DISPENSING MACHINE

[76] Inventors: Enrique Suay Puig; Javier Suay Puig, both of Calle 550, No. 28, La Cañada (Valencia), Spain

[21] Appl. No.: 677,224

[22] Filed: Dec. 3, 1984

[30] Foreign Application Priority Data

Dec. 2, 1983 [ES] Spain .................................. 276114

[51] Int. Cl.[4] .......................... A21C 5/04; G01F 11/10
[52] U.S. Cl. ................................. 222/218; 222/221; 425/241
[58] Field of Search ....................... 222/217, 218, 221; 425/238, 240, 241

[56] References Cited

U.S. PATENT DOCUMENTS 1,763,487  6/1930  Taylor ................................. 222/217
3,794,234  2/1974  Pardo ................................. 222/218

FOREIGN PATENT DOCUMENTS 2113302  6/1972  France .
2126935  10/1972  France ................................. 222/218
2181444  12/1973  France .
2237182  2/1975  France ................................. 222/218
2484085  12/1981  France .
2505143  11/1982  France .

Primary Examiner—Joseph J. Rolla
Assistant Examiner—Frederick R. Handren
Attorney, Agent, or Firm—Renner, Kenner, Greive, Bobak & Taylor

[57] ABSTRACT

A bread dough dispensing machine consisting of a drum (2) with a cylindrical hole (3) which runs from end to end and in which a piston (4) moves, both the drum (2) and the piston (4) having alternating movement which is transmitted to the drum (2) through a disk (9) and a rod (10) and to the piston (4) through a rotating arm (7) and a cam surface (8) which act on the end of the stem (5), the machine being equipped with a hopper (1) on the upper part of the drum (2) and an endless belt conveyor (11) on one side to which the dough is expelled.

1 Claim, 3 Drawing Figures

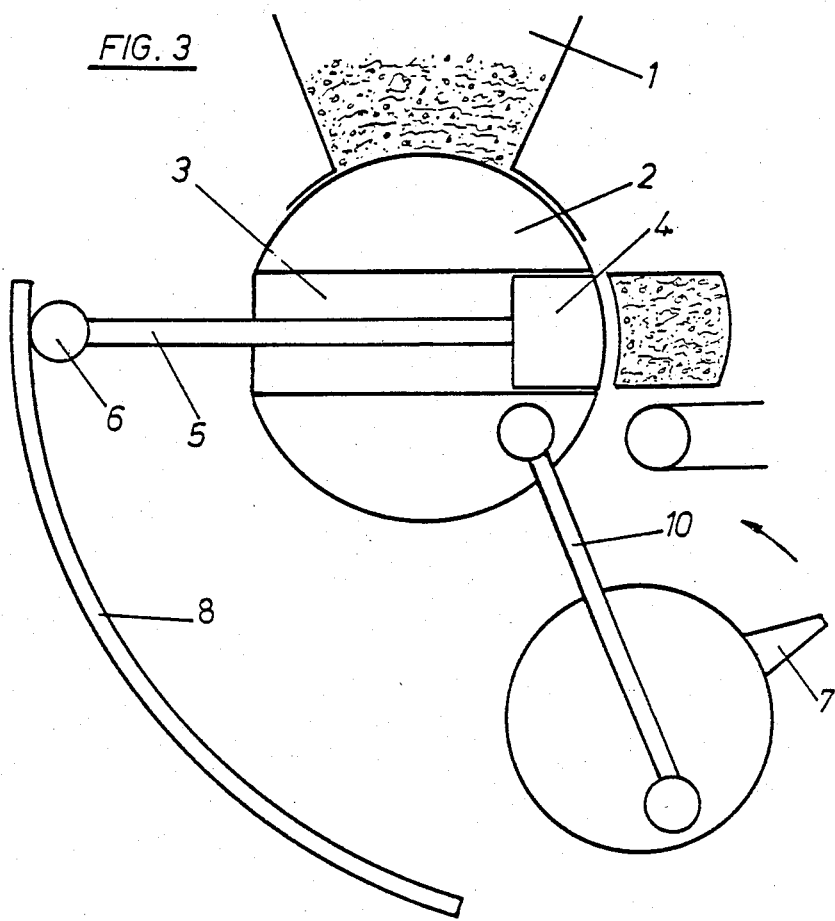

BREAD DOUGH DISPENSING MACHINE

TECHNICAL FIELD

This invention embodies an improvement to bread dough dispensing machines.

BACKGROUND ART

Dispensing machines consisting of a dough loading hopper, whose bottom is the lateral surface of a cylindrical drum with a transverse axis, are already known. This drum is activated by a mechanism which transmits an alternating movement (of approximately 90 degrees) to the drum around said axis. The drum forms a cylinder from end to end, within which there is a piston.

At one of the extreme positions of the drum, an end of said cylinder faces the hopper. The piston, in its downward path, draws in part of the dough contained in the hopper, into the cylinder. In the other extreme position, the said cylinder faces the discharge device and the piston expels at least part of the dough previously drawn towards this device.

In the known machines of this type, the alternating movement of the drum is obtained through a mechanism comprised of a disk or lever, provided with a continuous rotating movement which is transformed into alternating movement by a rod-crank system.

On the other hand, the displacement of the piston within the drum cylinder is the dough intake phase is obtained through a lever to which an oscillating movement is transmitted through an eccentric.

The displacement of the piston in the discharge phase is obtained through the sliding of a wheel rotating on a stem attached to the piston, this wheel sliding in a runner which takes on different positions depending on the weight of the dough to be dispensed.

This invention results in a simplification of said mechanisms.

DISCLOSURE OF THE INVENTION

As envisioned by the invention, a single transmission shaft moves a disk which, by means of a rod, gives the drum an alternating movement and that same shaft produces a continuous rotating movement in the arm, which at the point of its spin meets a rotating wheel mounted on the free extreme end of the piston stem, causing the same to slide in an approximately vertical direction, causing the dough to be drawn into the interior of the drum cylinder.

For a better understanding of all that is described in this document, the following is a detailed description which makes reference to the attached drawings, which present by way of example, in no way limiting, one practical way of realizing this invention.

BRIEF DESCRIPTION OF THE DRAWINGS

FIGS. 2 and 3 show schematic views similar to that shown by FIG. 1, but with the components in two positions successive to the position shown in FIG. 1.

PREFERRED EMBODIMENT FOR CARRYING OUT THE INVENTION

Figure 1:
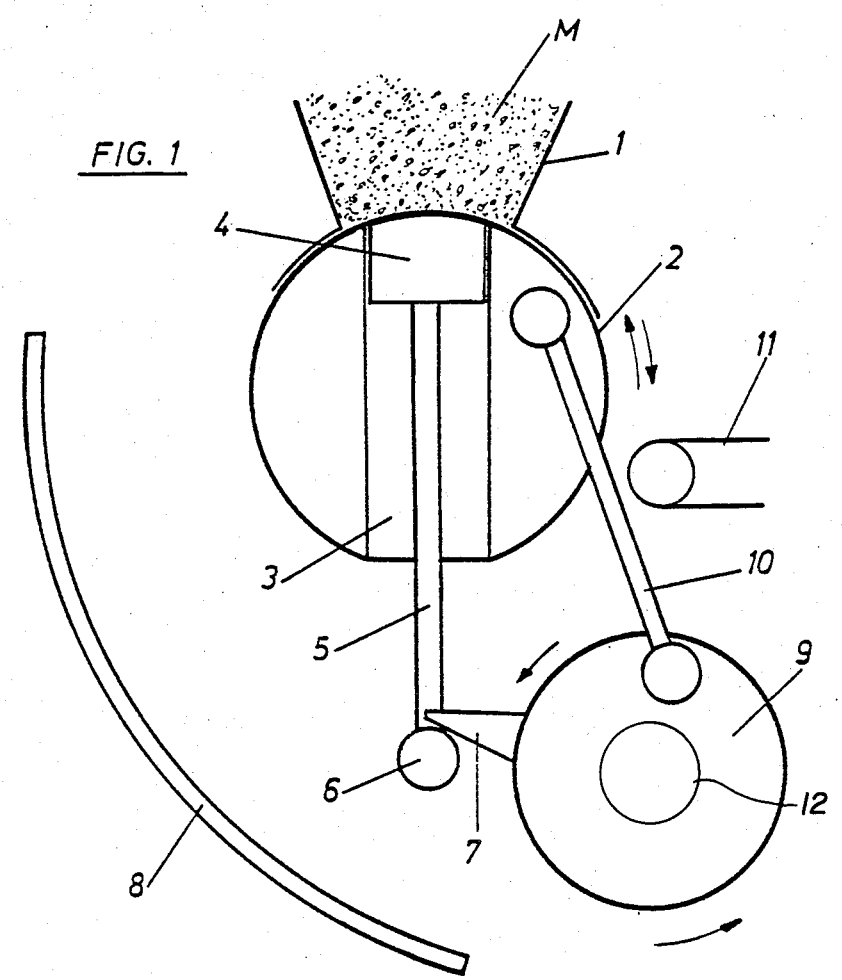
FIG. 1 shows a schematic view in a side elevation of the components which make up the machine.

With reference to the drawings it may be seen that the machine is comprised of a hopper 1, whose bottom is formed by the drum 2. The inside of the drum 2 has a cylindrical hole 3 running through it diametrically from end to end and within which piston 4 is mounted. The piston 4 can be activated back and forth by its stem 5, which has a wheel or follower 6 at its free extreme end, which is sometimes acted on by the arm 7 moved by the transmission shaft, and at other times by the cam surface 8.

Figure 2:
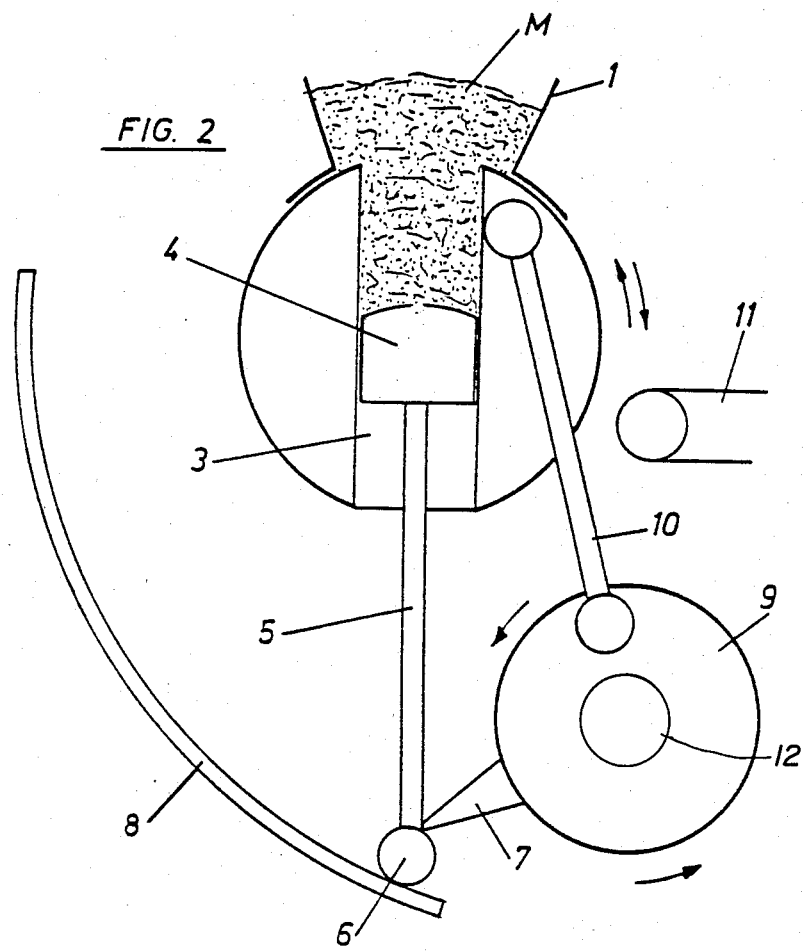

The same transmission shaft which moves the arm 7 moves the disk 9, the latter alternatively moving the drum 2 to which it is connected by the rod 10. The operation is as follows:

1. Both arm 7 and disk 9 are moved by the continuously revolving transmission shaft 12 which is shown in FIGS. 1 and 2.

2. For each complete rotation of disk 9, rod 10 transfers to the drum 2 a complete alternating movement of approximately 90 degrees.

3. The machine moves to the position shown in FIG. 2 since the arm 7, in its rotation, operates on the wheel 6, causing the longitudinal sliding of piston 4, and the consequent intake of the dough into cylinder 3, ending up at the point shown in FIG. 2, with the wheel 6 freed from the arm 7.

4. It must be noted that the rotation of the disk 9 between the positions of FIGS. 1 and 2 causes almost no movement of the drum 2.

5. While the disk 9 rotates between the positions in FIGS. 2 and 3, the drum 2 is rotated, rolling wheel 6 over the surface of the cam surface 8, causing the piston 4 to expel the dough contained in cylinder 3 to the outside onto conveyor 11.

6. The rotation of the disk 9 between the positions in FIGS. 3 and 1 effects the return rotation of the drum 2, all components returning to the initial position.

What is claimed is:

1. A bread dough dispensing machine of the type consisting of a hopper whose bottom is formed by the lateral surface of a drum driven in an alternating rotating movement, said drum having a cylindrical hole running through it diametrically from end to end and within which a piston is located, which piston carries a stem which extends through the cylindrical hole and out one end thereof the piston receding to draw in the dough to be dispensed, when the drum is rotated to a first position in which the cylindrical hole is in an approximately vertical position aligned with the hopper, and which piston advances expelling the dough, when the drum is rotated to a second position in which the cylindrical hole is in an approximately horizontal position, the improvement comprising a continuously rotating shaft, an arm attached to the shaft for rotation therewith and located so as to contact a follower on the end of the piston stem opposite the piston on each turn of the shaft when the drum is in its first position to thereby cause the receding movement of the piston, a disk connected to the shaft for rotation therewith, a rod pivotably connected at one end to the disk and pivotably connected at its other end to the drum so as to enable the rotation of the disk to impart the alternating rotating movement to the drum.

* * * * *